(12) United States Patent
Su et al.

(10) Patent No.: US 11,361,506 B2
(45) Date of Patent: Jun. 14, 2022

(54) HDR IMAGE REPRESENTATIONS USING NEURAL NETWORK MAPPINGS

(71) Applicant: Dolby Laboratories Licensing Corporation, San Francisco, CA (US)

(72) Inventors: Guan-Ming Su, Fremont, CA (US); Qing Song, Sunnyvale, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 17/045,941

(22) PCT Filed: Apr. 8, 2019

(86) PCT No.: PCT/US2019/026406
§ 371 (c)(1),
(2) Date: Oct. 7, 2020

(87) PCT Pub. No.: WO2019/199701
PCT Pub. Date: Oct. 17, 2019

(65) Prior Publication Data
US 2021/0150812 A1    May 20, 2021

Related U.S. Application Data

(60) Provisional application No. 62/654,614, filed on Apr. 9, 2018.

(30) Foreign Application Priority Data

Apr. 9, 2018 (EP) .................................. 18166320

(51) Int. Cl.
*G06T 17/20* (2006.01)
*G06K 9/62* (2022.01)
(Continued)

(52) U.S. Cl.
CPC ............ *G06T 17/20* (2013.01); *G06K 9/6227* (2013.01); *G06N 3/0454* (2013.01); *G06T 3/40* (2013.01); *G06T 9/001* (2013.01)

(58) Field of Classification Search
CPC ............................... G06T 17/20; G06K 9/6227
See application file for complete search history.

(56) References Cited

U.S. PATENT DOCUMENTS 7,142,723 B2  11/2006  Kang
7,149,262 B1  12/2006  Nayar
(Continued)

FOREIGN PATENT DOCUMENTS

EP   2697971   2/2014
EP   2945377   11/2015
(Continued)

OTHER PUBLICATIONS

Bouzaraa, F. et al "CNN Based Non-Local Color Mapping" IEEE International Symposium on Multimedia, Dec. 11, 2016, pp. 313-316.
(Continued)

*Primary Examiner* — Yi Yang

(57) ABSTRACT

Methods and systems for mapping images from a first dynamic range to a second dynamic range using a set of reference color-graded images and neural networks are described. Given a first and a second image representing the same scene but at a different dynamic range, a neural network (NN) model is selected from a variety of NN models to determine an output image which approximates the second image based on the first image and the second image. The parameters of the selected NN model are derived according to an optimizing criterion, the first image and the second image, wherein the parameters include node weights and/or node biases for nodes in the layers of the selected NN (Continued)

model. Example HDR to SDR mappings using global-mapping and local-mapping representations are provided.

12 Claims, 10 Drawing Sheets

(51) Int. Cl.
    *G06N 3/04*     (2006.01)
    *G06T 3/40*     (2006.01)
    *G06T 9/00*     (2006.01)

(56) References Cited

U.S. PATENT DOCUMENTS

| | | | |
|---|---|---|---|
| 7,382,931 | B2 | 6/2008 | Kang |
| 8,811,490 | B2 | 8/2014 | Su |
| 8,898,067 | B2 | 11/2014 | Villemoes |
| 9,516,351 | B2 | 12/2016 | Mertens |
| 9,607,366 | B1 | 3/2017 | Brailovskiy |
| 9,674,441 | B2 | 6/2017 | Tsubaki |
| 10,264,287 | B2 | 4/2019 | Wen |
| 2009/0317017 | A1 | 12/2009 | Au |
| 2010/0086213 | A1* | 4/2010 | Momoi ............ G06K 9/00362 382/195 |
| 2010/0246940 | A1* | 9/2010 | Lin .................. G06T 5/009 382/159 |
| 2014/0029675 | A1* | 1/2014 | Su .................. G06F 17/18 375/240.16 |
| 2015/0120626 | A1* | 4/2015 | Gupta ............... G06N 3/08 706/20 |
| 2015/0221280 | A1* | 8/2015 | Van Der Vleuten .... G06T 5/002 382/167 |
| 2015/0365688 | A1* | 12/2015 | Su .................. H04N 19/11 375/240.03 |
| 2016/0269756 | A1* | 9/2016 | Su .................. H04N 19/30 |
| 2016/0371822 | A1 | 12/2016 | Le Pendu |
| 2017/0078706 | A1 | 3/2017 | Van Der Vleuten |
| 2017/0272690 | A1 | 9/2017 | Seifi |
| 2017/0347044 | A1 | 11/2017 | Douady-Pleven |
| 2018/0007337 | A1 | 1/2018 | Barron |

FOREIGN PATENT DOCUMENTS

| | | |
|---|---|---|
| EP | 3324622 | 5/2018 |
| TW | 201036453 | 10/2010 |
| TW | 201215160 | 4/2012 |
| TW | 201719577 | 6/2017 |
| TW | 201724855 | 7/2017 |
| WO | 2016164235 | 10/2016 |
| WO | 2018064591 | 4/2018 |

OTHER PUBLICATIONS

Hagan, M.T. et al "Neural Network Design" (2nd edition), 2014.
Haykin, S.O. "Neural Networks and Learning Machines" 3rd Edition, Pearson, 2008.
Kim, Baek-Kyu et al "Tone Mapping with Contrast Preservation and Lightness Correction in High Dynamic Range Imaging" Signal, Image and Video Processing, Nov. 2016.
Eilertsen, G. et al "HDR Image Reconstruction from a Single Exposure Using Deep CNNs" ACM Transactions on Graphics, vol. 36, No. 6, Nov. 2017, 178:1-15.
Hirao, K. et al "A Study on HDR Image Generation Method from an SDR Image using Deep Neural Networks" vol. 116, No. 496, Feb. 2017, pp. 37-42.
Le Pendu, M. et al "Local Inverse Tone Curve Learning for High Dynamic Range Image Scalable Compression" IEEE Transactions on Image Processing, vol. 24, No. 12, IEEE, pp. 5753-5763.

* cited by examiner

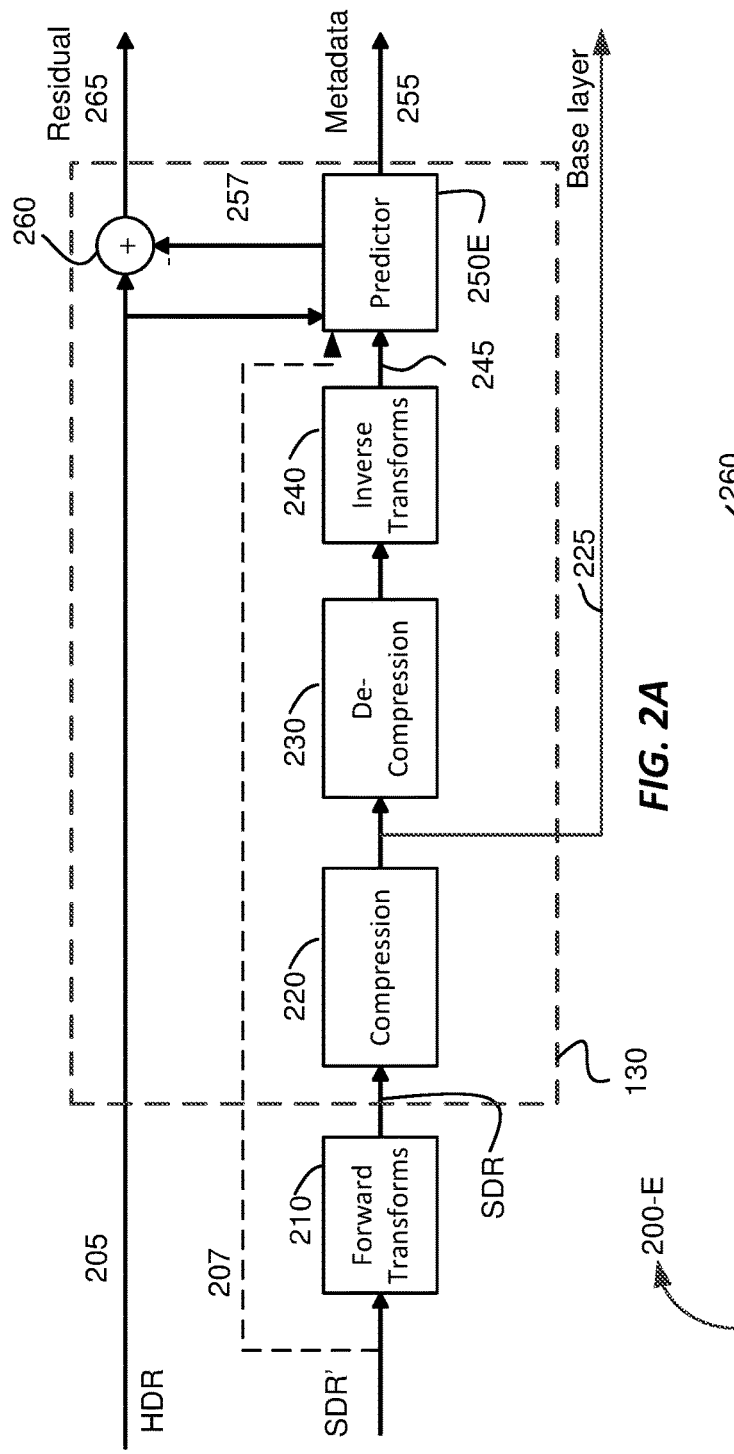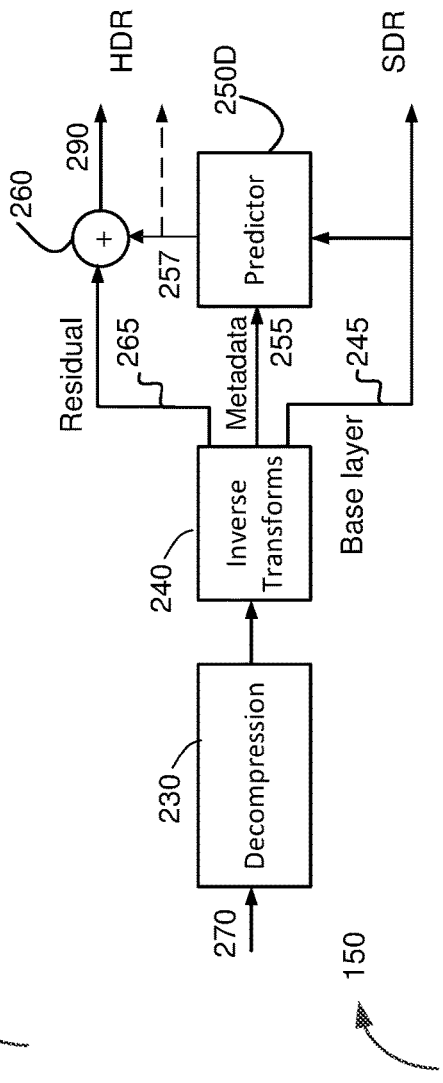
FIG. 2A
FIG. 2B

HDR IMAGE REPRESENTATIONS USING NEURAL NETWORK MAPPINGS

CROSS-REFERENCE TO RELATED APPLICATIONS

This application claims the benefit of priority to U.S. Provisional Patent Application No. 62/654,614, filed Apr. 9, 2018, and to European Patent Application No. 18166320.4, filed Apr. 9, 2018, both of which are hereby incorporated by reference in their entirety.

TECHNOLOGY

The present invention relates generally to images. More particularly, an embodiment of the present invention relates to mapping high dynamic range images from one representation to another using neural network mappings.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the 14-15 orders of magnitude of the human visual system (HVS). In practice, the DR over which a human may simultaneously perceive an extensive breadth in intensity range may be somewhat truncated, in relation to HDR. As used herein, the term visual dynamic range (VDR) may individually or interchangeably relate to the DR that is perceivable within a scene or image by a human visual system (HVS) that includes eye movements, allowing for some light adaptation changes across the scene or image. As used herein, VDR may relate to a DR that spans 5 to 6 orders of magnitude. Thus, while perhaps somewhat narrower in relation to true scene referred HDR, VDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range. HDR images may also be stored and distributed using high-precision (e.g., 16-bit) floating-point formats, such as the OpenEXR file format developed by Industrial Light and Magic.

Most consumer desktop displays currently support luminance of 200 to 300 $cd/m^2$ or nits. Most consumer HDTVs range from 300 to 500 nits with new models reaching 1000 nits ($cd/m^2$). Such conventional displays thus typify a lower dynamic range (LDR), also referred to as a standard dynamic range (SDR), in relation to HDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more).

As discussed in U.S. Pat. No. 8,811,490, "Multiple color channel, multiple regression predictor," by G-M Su et al., image prediction techniques play a significant role in the efficient coding and distribution of HDR content using both single-layer and multi-layer coding techniques. Image prediction can be considered a special case of image mapping, where an image in a first representation (say, in terms of dynamic range and/or color gamut, e.g., an SDR image) is mapped to an image of a second representation (e.g., an HDR image).

In artificial neural networks, according to the "universal approximation theorem," given appropriate parameters, a wide range of functions could be represented by a variety of simple neural networks (NNs). As appreciated by the inventors here, improved techniques for image mapping between HDR images and/or derivative HDR or SDR images using simple neural networks are desired.

US 2010246940 A1 describes a method of generating a high dynamic range image and an electronic device using the same. The method includes loading a brightness adjustment model created by a neural network algorithm; obtaining an original image; acquiring a pixel characteristic value, a first characteristic value in a first direction, and a second characteristic value in a second direction of the original image; and generating an HDR image through the brightness adjustment model according to the pixel characteristic value, the first characteristic value, and the second characteristic value of the original image. The electronic device includes a brightness adjustment model, a characteristic value acquisition unit, and a brightness adjustment procedure. The electronic device acquires a pixel characteristic value, a first characteristic value, and a second characteristic value of an original image through the characteristic value acquisition unit, and generates an HDR image from the original image through the brightness adjustment model.

WO2018064591 (A1) describes methods for generating video frames using neural networks. One of the methods includes processing a sequence of video frames using an encoder neural network to generate an encoded representation; and generating a predicted next frame pixel by pixel according to a pixel order and a channel order, comprising: for each color channel of each pixel, providing as input to a decoder neural network (i) the encoded representation, (ii) color values for any pixels before the pixel in the pixel order, and (iii) color values for the pixel for any color channels before the color channel in the channel order, wherein the decoder neural network is configured to generate an output defining a score distribution over a plurality of possible color values, and determining the color value for the color channel of the pixel by sampling from the score distribution.

In Fahd Bouzaraa "*CNN Based Non-Local Color Mapping*", 2016 IEEE International Symposium on Multimedia ISM, 11 Dec. 2016, pages 313-316, color mapping for transferring the colors of an image to a reference distribution is discussed. In this way, it is possible to simulate different camera exposures using a single image, e.g., by transforming a dark image to a brighter image showing the same scene. Most approaches for color mapping are local in the sense that they just apply a pixel-wise (local) mapping to generate the color mapped image. In the presented approach, however, a non-local mapping is proposed which is based on learned features directly from the image-texture, using a convolutional neural network.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which:

FIG. 2A depicts an example HDR encoding system;

FIG. 2B depicts an example HDR decoding system;

DESCRIPTION OF EXAMPLE EMBODIMENTS

Deriving image-mapping functions based on neural-networks is described herein. Given a set of corresponding images, that is, images that represent the same scene but at different levels of dynamic range, this section describes methods that allow an encoder to approximate one of the images in terms of another using a neural-networks-based mapping. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to deriving image-mapping functions using neural networks. In a first embodiment, an encoder has access to one or more neural network (NN) models, each adapted to approximate an image having a first dynamic range in terms of an image having a second dynamic range. The encoder receives a first image in the first dynamic range and a second image in the second dynamic range, wherein the two images represent the same scene. The encoder selects a neural network model from the variety of NN models to determine an output image which approximates the second image based on the first image and the second image. Next, it determines at least some values of the parameters of the selected NN model according to an optimizing criterion, the first image, and the second image, wherein the parameters comprise node weights and/or node biases to be used with an activation function for at least some of the nodes in at least one layer of the selected NN model. At this, it should be mentioned that some node weights and/or node biases may be pre-determined and, thus, it may not be necessary to determine all values of the parameters of the selected NN model according to the optimizing criterion. The generated output image may be compressed, and the NN parameters characterizing the mapping may be coded as metadata to be passed to a decoder.

In a second embodiment, a decoder receives a compressed bitstream comprising an encoded image in a first dynamic range and image metadata, wherein the image metadata comprise parameters for a neural network (NN) model to map the encoded image to an output image in a second dynamic range. For one or more color components of the encoded image, the image metadata may comprise: the number of neural-net layers in the NN, the number of neural nodes for at least one layer, and weights and offsets to be used with an activation function in some nodes of the at least one layer. After decoding the encoded image, the decoder generates an output image in the second dynamic range based on the encoded image and the parameters of the NN model.

Example HDR-SDR System

Figure 1:
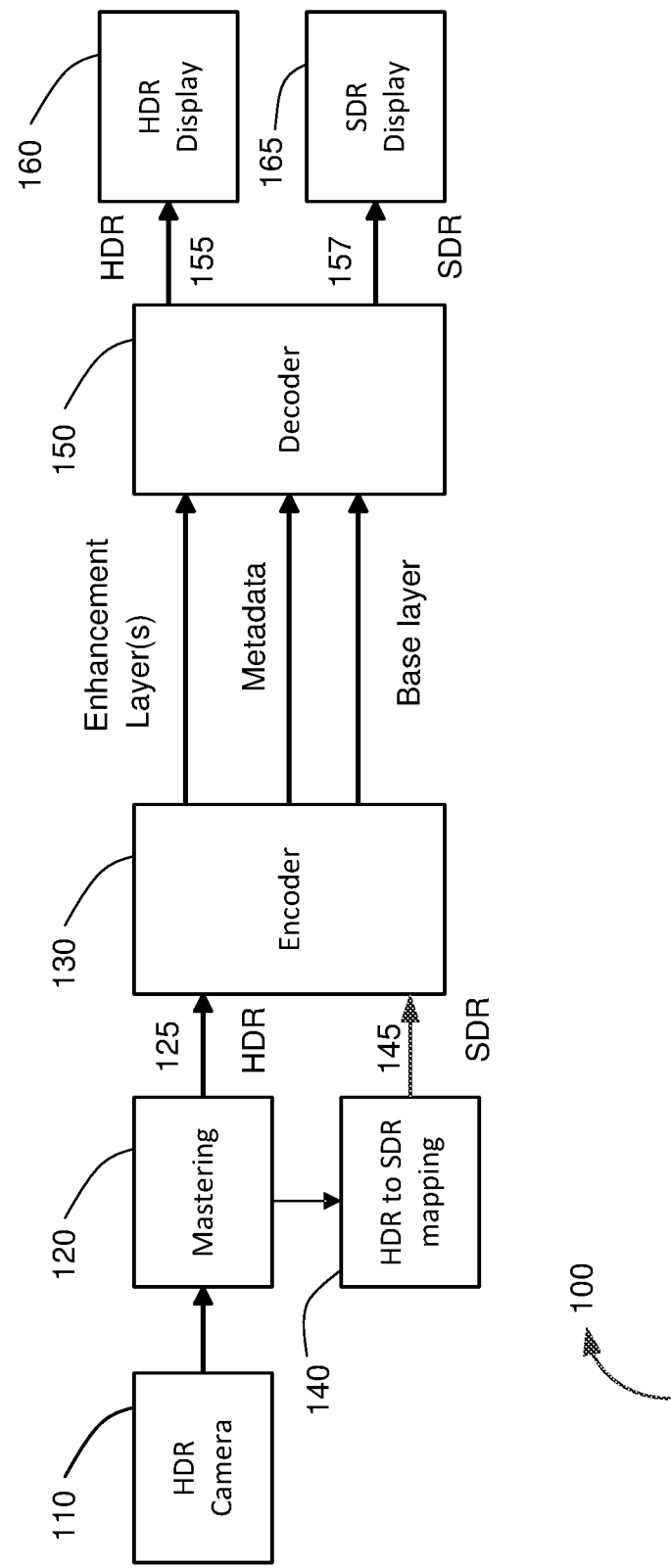
FIG. 1 depicts an example data flow for coding and transmitting HDR data.

FIG. 1 depicts an example data flow in a HDR-SDR system (100), according to an embodiment of the present invention. An HDR image or video sequence is captured using an HDR camera (110). Following capture, the captured image or video is processed by a mastering process (120) to create a target HDR image (125). The mastering process may incorporate a variety of processing steps, such as: editing, primary and secondary color correction, color transformation, and noise filtering. The HDR output (125) of this process represents the director's intend on how the captured image will be displayed on a target HDR display (e.g., HDR display 160).

The mastering process may also output a corresponding SDR image (145), representing the director's intend on how the captured image will be displayed on a legacy SDR display (165). The SDR output (e.g., 145-1 or 145-2) may be provided directly from mastering circuit 120, it may be generated with a separate HDR-to-SDR converter 140, or it may be generated with the help of a colorist.

As used herein, the term "trim-pass" denotes a phase in content production wherein a video stream created on a first target display (say, a professional monitor at 4,000 nits) is remapped into a second stream for second target display with a different dynamic range and/or color gamut (say, for an SDR TV at 300 nits). A trim-pass may be further adjusted by a colorist to generate a "color-grade" of the original video stream. A studio may create multiple "trims" and/or "color grades," say, for releases in: SDR movie theaters (e.g., 48 nits), HDR movie theaters (e.g., 100 nits), SDR TVs (e.g., 300 nits), HDR TVs (e.g., 1,000 nits), and the like. Two trims may also have the same dynamic range, but different color gamut. As used herein, the term "derivative picture" denotes any such trimmed or color-graded picture that was derived from a master HDR or SDR picture.

In this example embodiment, the HDR 125 and SDR 145 signals are input into an encoder 130. Purpose of encoder 130 is to create a coded bitstream that reduces the bandwidth required to transmit the HDR and SDR signals, but also allows a corresponding decoder 150 to decode and render either the SDR or HDR signals. In an example implementation, encoder 130 may be a single-layer or a multi-layer encoder, such as one of those defined by the MPEG-2 and H.264 coding standards, which represents its output as a base layer, optional one or more enhancement layers, and metadata. As used herein, the term "metadata" relates to any auxiliary information that is transmitted as part of the coded bitstream and assists a decoder to render a decoded image. Such metadata may include, but are not limited to, such data as: color space or gamut information, dynamic range information, tone mapping information, or NN node parameters, such as those described herein.

On the receiver, a decoder (150), uses the received coded bitstreams and metadata to render either an SDR image (157) or a HDR image (155), according to the capabilities of the target display. For example, an SDR display (165) may use only the base layer and the metadata to render an SDR image. In contrast, an HDR display (160) may use information from all input layers and the metadata to render the HDR signal.

In some embodiments, system (100) may apply "reshaping" of the input video content (not shown) to better match the capabilities of the video encoder in 130. As used herein, the term "forward reshaping" denotes a process of sample-to-sample or codeword-to-codeword mapping of a digital image from its original bit depth and original codewords distribution or representation (e.g., gamma, PQ, or HLG, and the like) to an image of the same or different bit depth and a different codewords distribution or representation. Reshaping allows for improved compressibility or improved image quality at a fixed bit rate. For example, without limitation, reshaping may be applied to 10-bit or 12-bit PQ-coded HDR video to improve coding efficiency in a 10-bit video coding architecture. In a receiver, after decompressing the reshaped signal, the receiver may apply an "inverse reshaping function" to restore the signal to its original codeword distribution. An example of image reshaping can be found in PCT Application PCT/US2016/025082, *In-Loop Block-Based Image Reshaping in High Dynamic Range Video Coding*, by G-M. Su, filed on Mar. 30, 2016, also published as WO 2016/164235.

FIG. 2A shows in more detail an example implementation of encoder 130 incorporating the methods of this invention. In FIG. 2A, SDR' (207) denotes an enhanced SDR signal. SDR video today is 8-10 bits, 4:2:0, ITU Rec. 709 data. SDR' may have the same color space (primaries and white point) as SDR, but may use high precision, say 12-bits per pixel, with all color components at full spatial resolution (e.g., 4:4:4 RGB). From FIG. 2A, SDR can easily be derived from an SDR' signal using a set of forward transforms that may include quantization (or forward reshaping) from say 12 bits per pixel to 10 bits per pixel, color transformation, say from RGB to YUV, and color subsampling, say from 4:4:4 to 4:2:0. The SDR output of converter 210 is applied to compression system 220. Depending on the application, compression system 220 can be either lossy, such as H.264, MPEG-2, and the like, or lossless. The output of the compression system 220 may be transmitted as a base layer 225. To reduce drift between the encoded and decoded signals, it is not uncommon for encoder 130 to follow compression process 220 with a corresponding decompression process 230 and inverse transforms 240, corresponding to the forward transforms of 210. Thus, predictor (250E) may have the following inputs: HDR input 205 and either SDR signal 245, which corresponds to the SDR' signal as it will be received by a corresponding decoder, or input SDR' 207. Predictor 250E, using input HDR and SDR data will generate signal 257 which represents an approximation or estimate of input HDR 205. In layered systems, adder 260, subtracts the predicted HDR 257 from the original HDR 205 to form output residual signal 265. Subsequently (not shown), residual 265 may also be coded by another lossy or lossless encoder, and may be transmitted to the decoder as an enhancement layer.

Predictor 250E may also provide the prediction parameters being used in the prediction process as metadata (255). Since prediction parameters may change during the encoding process, for example, on a frame by frame basis, or on a scene by scene basis, these metadata may be transmitted to the decoder as part of the data that also include the base layer and the enhancement layer.

Since both HDR 125 and SDR 145 represent the same scene, but are targeting different displays with different characteristics, such as dynamic range and color gamut, it is expected that there is a very close correlation between these two signals. In example embodiments of this invention, novel mapping functions are developed which allow the input reference signals to be mapped to approximate representations using a neural network mapping. While, examples are provided for HDR to SDR mappings, the same techniques can be used for image mapping between two different HDR grades, two different SDR grades, or between SDR and HDR grades.

Embodiments of the present invention may be implemented either on an image encoder or an image decoder. FIG. 2B shows an example implementation of decoder 150 according to an embodiment of this invention. Decoding system 150 receives a coded bitstream (270), e.g., one generated from encoder 200-E, which may combine a base layer (e.g., 245), an optional enhancement layer (or residual) (e.g., 265), and metadata (255), which are extracted following decompression (230) and miscellaneous inverse transforms (240). For example, in a HDR-SDR system, the base layer (245) may represent the SDR representation of the coded HDR signal and the metadata 255 may include information about the neural network mapping (NNM) that was used in the encoder predictor 250E and the corresponding NNM parameters. In one example implementation, when the encoder uses NN mapping according to the methods of this invention, metadata may include the identification of the model being used (for example, global mapping, local mapping, and the like) and all parameters associated with that specific model. Given base layer 245 and the NNM-related parameters extracted from the metadata 255, predictor 250D can compute predicted HDR (257). If there is no residual, or the residual is negligible, the predicted signal 257 can be outputted directly as the final HDR image.

Otherwise, in adder 260, the output (257) of the predictor (250D) is added to the residual 265 to output HDR signal 290.

Example Neural Network Mappings

Background

Without limitation, let $v_i=[v_i^y \; v_i^{c0} \; v_i^{c1}]^T$ denote a 3-color value (e.g., RGB or YCbCr, and the like) of the i-th pixel from a first image, such as an HDR image (125). Denote the corresponding i-th pixel in the second image (e.g., SDR image 145) as $s_i=[s_i^y \; s_i^{c0} \; s_i^{c1}]^T$. Denote the total number of pixels in each image as P and assume that all pixel values are normalized between [0 1]. One would like to find the mapping function, M( ), mapping pixel values from the first image to corresponding pixel values in the second image (or vice versa), i.e.:

$$s_i \approx M(v_i), \quad (1a)$$

or $$v_i \approx M(s_i). \quad (1b)$$

In an embodiment, in a multi-layer neural network, the j-th layer may be expressed as a non-linear function of weights and biases applied to each of its inputs:

$$x_j = \Phi_j(x_{j-1}) = f_j(W_j x_{j-1} + b_j), j=0,1,2,\ldots,L, \quad (2)$$

where $W_j$ is a weighting matrix, $b_j$ is a bias vector, $f_j(\ )$ is an activation function, $x_{j-1}$ is the input (from previous layer's output), and $x_j$ is the current layer's output. For example, $x_j$ may be represented as $$x_j = [x_{j1} x_{j2} \ldots x_{jN_j}]^T,$$

where $N_j$ denotes the number of nodes at the j-th level of the neural network. Note that the number of nodes at the j-th level may be different than the number of nodes in another level. Given a NN with L layers, it may be denoted as a $[N_0 \; N_1 \ldots N_{L-1}]$ NN. For example, an [8 4 4] NN denotes a neural network with three layers, with 8 nodes in the first layer and 4 nodes in each of the other two layers.

There are several commonly used activation functions, $f_j(\ )$. In an embodiment, $f_j(\ )$ is a sigmoid function:

$$f_j(t) = \frac{2}{1+e^{-2t}} - 1. \quad (3)$$

For the first layer (e.g., j=0), the input will be the original input pixel values, i.e., assuming the mapping of equation (1a), then $x_{-1}=v_i$.

Note: in the rest of this description, input and output parameters of a NN may be expressed in terms of the mapping in equation (1a); however, methods described herein may be easily extended to represent the mapping of equation (1b) by simply switching the SDR and HDR inputs.

An L-hidden-layer network will have $$\hat{s}_i = \Phi_L(\Phi_{L-1} \ldots \Phi(v_i)),$$

or $$\hat{s}_i = f_L(W_L \ldots f_1(W_1 f_0(W_0 v_i + b_0) + b_1) \ldots + b_L). \quad (4)$$

Figure 6:
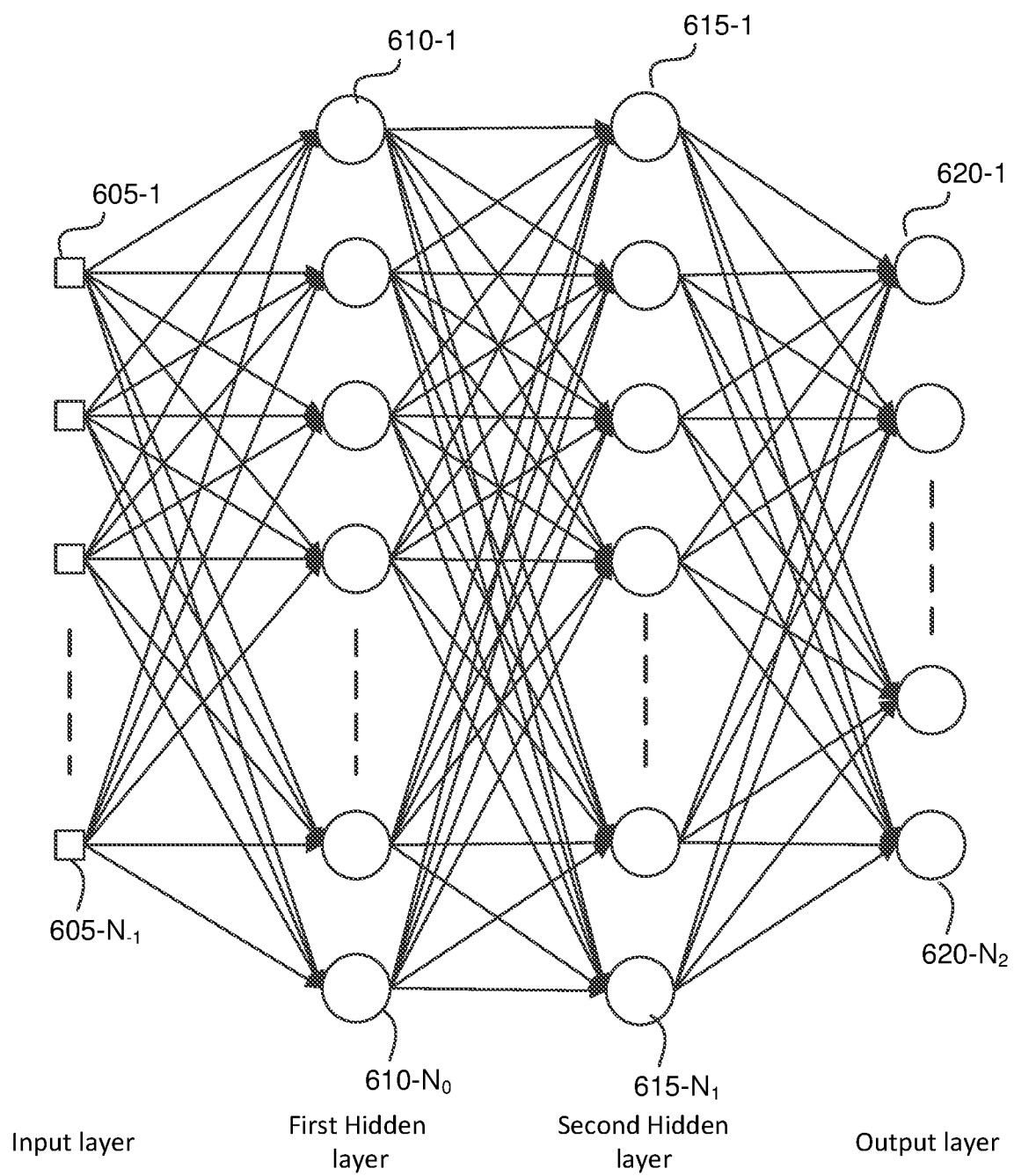
FIG. 6 depicts an example neural network with two hidden layers.

FIG. 6 depicts an example neural network with an input layer (605) two hidden layers (610 and 615) and one output layer (620). The input nodes (605-1 to 605-$N_{-1}$) represent our input pixels (e.g., $v_i$), the output nodes (620-1 to 620-$N_2$) represent our mapping values (e.g., $\hat{s}_i$), and the nodes in the hidden first layer (610-1 to 610-$N_0$) and second layer (615-1 to 615-$N_1$) represent $x_0=\Phi_0(v_i)$ and $x_1=\Phi_1(x_0)$ respectively.

The goal is to find the parameters $\{W_j, b_j\}$, $j=0, 1, \ldots, L$, in all (L+1) layers, to minimize the total minimum square error (MSE) for all P pixels:

$$E = \sum_{i=0}^{P-1} |s_i - \hat{s}_i|^2. \quad (5)$$

The problem can be formally formulated as:

$$\arg\min_{\{W_j, b_j\}} \sum_{i=0}^{P-1} |s_i - \hat{s}_i|^2. \quad (6)$$

In an embodiment, a solution to equation (6) can be found using "back propagation." Note that instead of having a single NN, one may also employ three or more neural networks, one for each one of the color components in the input signals.

Input Normalization

In an embodiment, performance can be improved by renormalizing the input signals to the range [−1 1]. In such an implementation, the neural network needs to include
- a pre-scaling stage (normalization), where each channel in the input signal is scaled to [−1 1]
- a post-scaling stage (de-normalization), where each channel in the output signal, which is in [−1 1], is scaled back to the original range Denote the minimum and maximum values for each input color channel (denoted as y, c0, and c1) as $$v_{max}^y = \max\{v_i^y\}, \; v_{min}^y = \min\{v_i^y\}$$

$$v_{max}^{c0} = \max\{v_i^{c0}\}, \; v_{min}^{c0} = \min\{v_i^{c0}\}$$

$$v_{max}^{c1} = \max\{v_i^{c1}\}, \; v_{min}^{c1} = \min\{v_i^{c1}\}$$

The gain to perform normalization to a new dynamic range $[n_{min}^y, n_{max}^y]$ (i.e., [−1 1] in our example) can be derived as $$G^y = \frac{n_{max}^y - n_{min}^y}{v_{max}^y - v_{min}^y} \quad (7)$$

$$G^{c0} = \frac{n_{max}^{c0} - n_{min}^{c0}}{v_{max}^{c0} - v_{min}^{c0}}.$$

$$G^{c1} = \frac{n_{max}^{c1} - n_{min}^{c1}}{v_{max}^{c1} - v_{min}^{c1}}$$

The normalization is performed as $$x_i^y = G^y \cdot (v_i^y - v_{min}^y) + n_{min}^y$$

$$x_i^{c0} = G^{c0} \cdot (v_i^{c0} - v_{min}^{c0}) + n_{min}^{c0}.$$

$$x_i^{c1} = G^{c1} \cdot (v_i^{c1} - v_{min}^{c1}) + n_{min}^{c1} \quad (8)$$

The denormalization can be computed as:

$$\tilde{s}_i^y = \frac{\hat{s}_i^y - n_{min}^y}{G^y} + v_{min}^y \quad (9)$$

-continued $$\tilde{s}_i^{c0} = \frac{\hat{s}_i^{c0} - n_{min}^{c0}}{G^{c0}} + v_{min}^{c0}$$

$$\tilde{s}_i^{c1} = \frac{\hat{s}_i^{c1} - n_{min}^{c1}}{G^{c1}} + v_{min}^{c1}$$

An L-layer neural-network based mapping can be represented using the following parameters, which can be communicated to a receiver as metadata.
  the normalization parameters for each input component (e.g., gain, min, and max) $\{G, n_{min}, n_{max}\}$
  the L-layer neural parameters; e.g., in the j-th layer, $\{W_j, b_j\}$, j=0, 2, ..., L Next, three different example embodiments are described in detail.

Image Mapping Using a Global Mapping NN

Figure 3A:
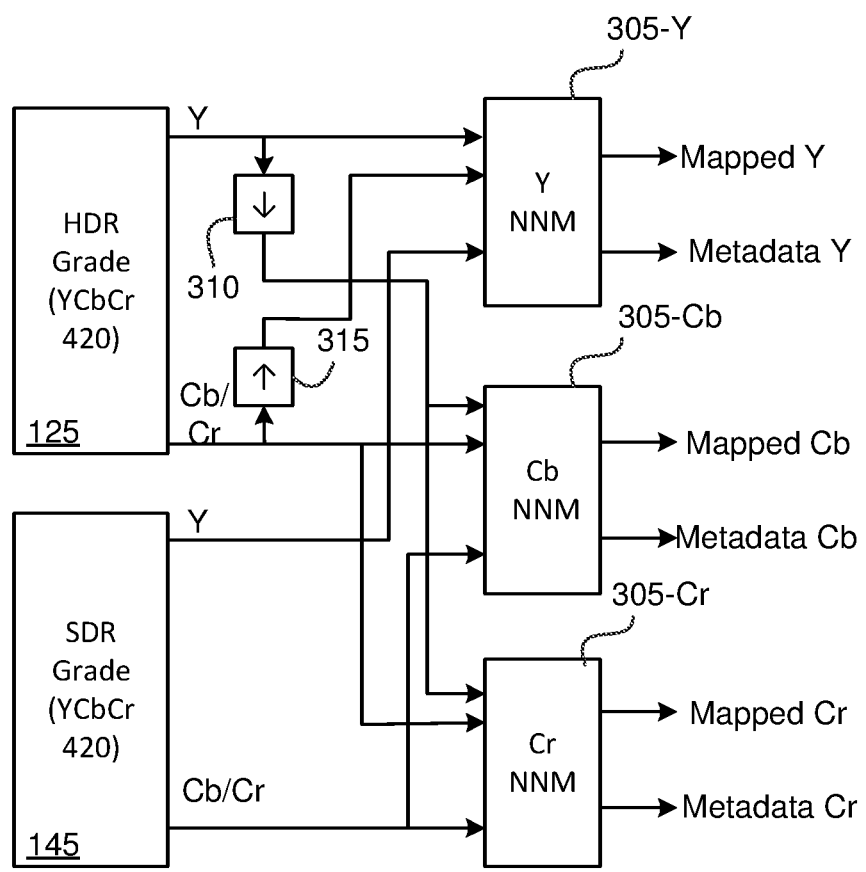
FIG. 3A depicts an example system for generating a global mapping using neural networks, according to an embodiment of the present invention.

FIG. 3A depicts an example system for generating an HDR-to-SDR mapping according to an embodiment of global mapping, where the same pixel mapping is performed on the whole image, regardless of the pixel's location. As an example, without loss of generality, it is assumed that the inputs are in YCbCr 4:2:0 format; however, similar architectures are applicable regardless of the color format being used (e.g., YCbCr 4:2:2 or 4:4:4, RGB, ICtCp, and the like). Given reference HDR (125) and SDR (145) frames, three neural networks (305) are used to map Y, Cb, and Cr. Because of the input 4:2:0 format, in an embodiment, down-scaler 310 and up-scaler 315 may be used so that all inputs to the NN units (305) have the same spatial resolution. These upscaling and downscaling functions can be eliminated if the input is in a 4:4:4 format. As depicted in FIG. 3A:
  Y-NNM (305-Y) has inputs $v^y$, $v^{Cb,Cr}$ (up-sampled), and $s^Y$, and outputs mapped SDR $\hat{s}^Y$ and metadata
  Cb-NNM (305-Cb) has inputs $v^Y$(down-sampled), $v^{Cb,Cr}$, and $s^{Cb}$, and outputs mapped SDR $\hat{s}^{Cb}$ and metadata
  Cr-NNM (305-Cr) has inputs $v^Y$(down-sampled), $v^{Cb,Cr}$, and $s^{Cr}$ and outputs mapped SDR $\hat{s}^{Cr}$ and metadata Each NNM 305 may comprise a single layer (e.g., one layer with 16 nodes, denoted as [16]), or multiple layers (e.g., a [8 4 4] NN). Implementation examples for NNM may be found in M. T. Hagan, et al., "*Neural Network Design*" (2nd Edition), 2014, or in S. O. Haykin, "*Neural Networks and Learning Machines*," (3rd Edition), Pearson, 2008. The MATLAB functions fitnet and train in Matlab's Neural NetworkToolbox may also be used.

Image Mapping Using Local Mapping NN

Figure 3B:
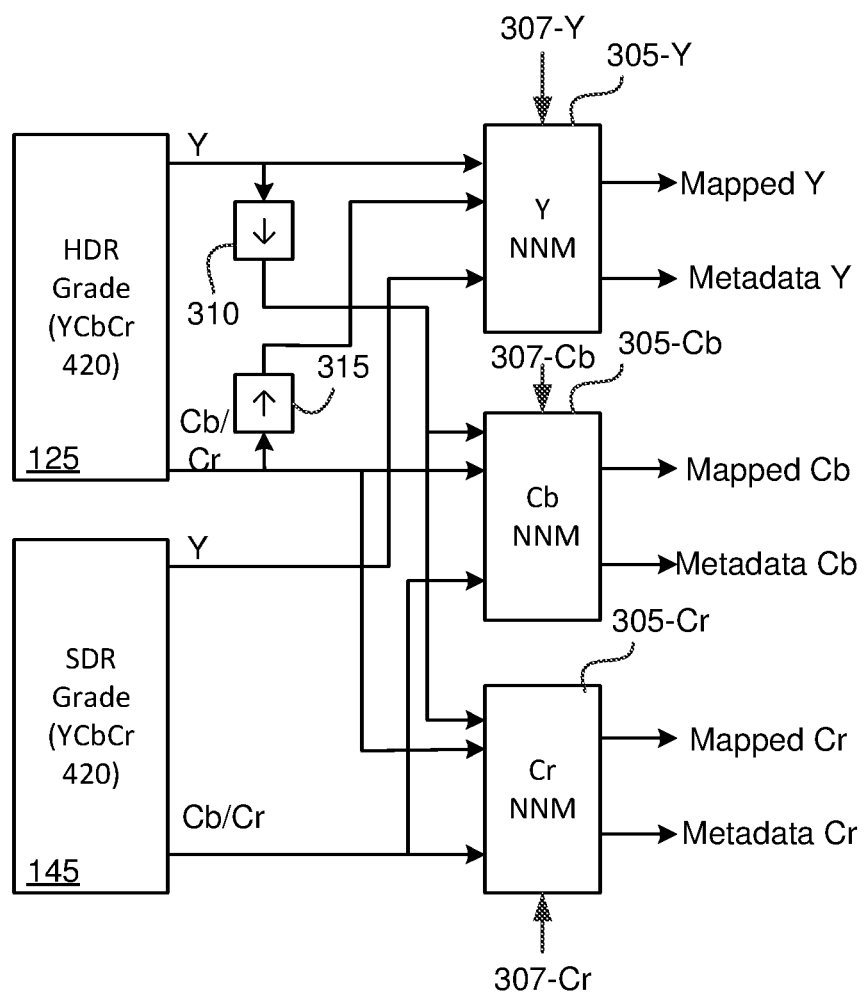
FIG. 3B depicts an example system for generating a local mapping using neural networks, according to an embodiment of the present invention.

FIG. 3B depicts an example system for generating an HDR-to-SDR mapping according to an embodiment where pixel mapping is performed at the local level (local mapping). To model this spatial domain variance, the neural network mapping (NNM) units (305) include an additional input 307 representing positional pixel information. Let $(x_i, y_i)$ denote the normalized coordinates for the i-th pixel, i.e. $x_i \in [0,1]$ and $y_i \in [0,1]$. These normalized values can be computed by dividing the original coordinates by the corresponding dimensions (e.g., width and height) of the image. Then, the input HDR vector may be represented as $$v_i^{LT} = [v_i^y v_i^{c0} v_i^{c1} x_i y_i]^T. \quad (10)$$

As depicted in FIG. 3B:
  Y-NNM (305-Y) has inputs $v^1$, $v^{Cb,Cr}$ (up-sampled), $s^Y$, and $(x^Y, y^Y)$, and outputs mapped SDR $\hat{s}^{Cb}$ and metadata Cb-NNM (305-Cb) has inputs $v^Y$(down-sampled), $v^{Cb,Cr}$, $s^{Cb}$, and $(x^{Cb}, y^{Cb})$ and outputs mapped SDR sc and metadata
  Cr-NNM (305-Cr) has inputs $v^Y$(down-sampled), $v^{Cb,Cr}$, $s^{Cr}$, and $(x^{Cr}, y^{Cr})$, and outputs mapped SDR $\hat{s}^{Cr}$ and metadata Given that the inputs are in YCbCr 4:2:0 format, the luma and chroma components require different processing. For luma, Y-NNM (305-Y), in input 307-Y, it uses the full resolution $(x_i, y_i)$; however, for chroma, Cb-NNM (305-Cb) and Cr-NNM (305 Cr), in inputs 307-Cb and 307-Cr, they use scaled versions of the original resolution $(x_i, y_i)$ (e.g. $x_i/2$, $y_i/2$). Note that both coordinates need to be in the normalized [0,1] domain. The only difference is that the location is normalized by different image sizes.

Image Mapping Using Multiple Grades

Figure 3C:
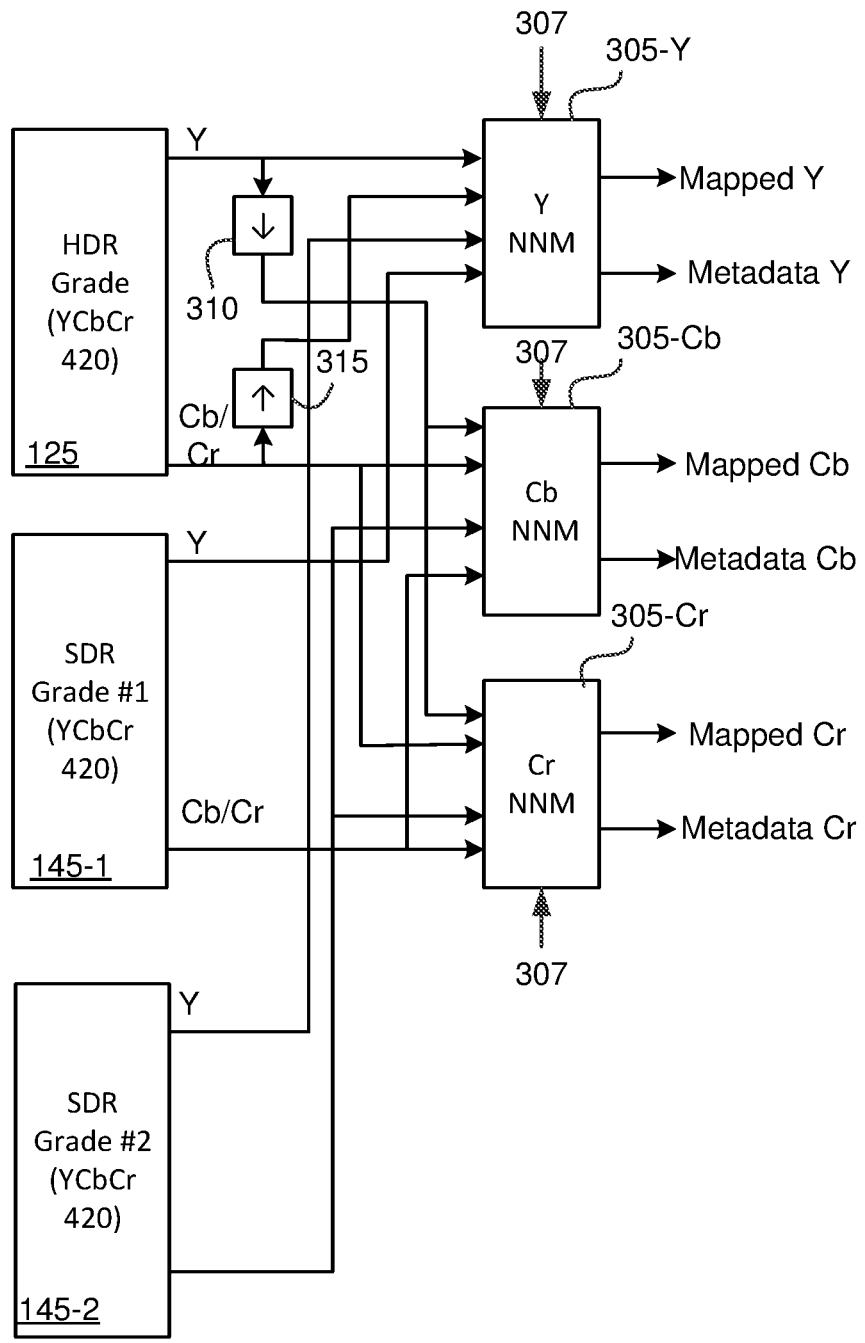
FIG. 3C depicts an example system for generating a global mapping with multiple grades using neural networks, according to an embodiment of the present invention.

In an embodiment, as discussed earlier, it is possible that an encoder may have access to multiple SDR or HDR "grades" or "trims." Then, as shown in FIG. 3C, the neural network mapping networks may take advantage of the multiple trims to further improve the mapping from one representation to another.

Denote as $s_{k,i} = [s_{k,i}^y s_{k,i}^{c0} s_{k,i}^{c1}]^T$ the three-color values of the i-th pixel in the reference image for the k-th grade. In an embodiment, all grades may be concatenated together as a vector $$s_i^{MG} = [s_{0,i} s_{1,i} \ldots s_{K-1,i}]. \quad (11)$$

Then, for each NNM, the input vector needs to include the normalized target brightness value (e.g. in nits), $t_k \in [0,1]$ and becomes a 4-input vector.

$$v_{k,i} = [v_i^y v_i^{c0} v_i^{c1} t_k]^T, \quad (12a)$$

$$v_i^{MG} = [v_{0,i} v_{1,i} \ldots v_{k-1,i}]. \quad (13b)$$

For example, for the 100 nits trim, $t_0 = 0.1$, and for the 600 nits, $t_1 = 0.6$. These grade IDs can be fed using ports (307). Again, the mapping problem can be expressed as solving for the mapping function M( ), where $$s_i^{MG} \approx M(v_i^{MG}). \quad (14)$$

As depicted in FIG. 3C:
  Y-NNM (305-Y) has inputs $v^1$, $v^{Cb,Cr}$ (up-sampled), $s^Y$, and available grade IDs (say, $t_0$, $t_1$, and $t_2$), and outputs mapped SDR $\hat{s}^Y$ and metadata
  Cb-NNM (305-Cb) has inputs $v^Y$(down-sampled), $v^{Cb,Cr}$, $s^{Cb}$, and $(x^{Cb}, y^{Cb})$ and available grade IDs (say, $t_0$, $t_1$, and $t_2$), and outputs mapped SDR sc and metadata
  Cr-NNM (305-Cr) has inputs $v^Y$(down-sampled), $v^{Cb,Cr}$, $s^{Cr}$, and available grade IDs (say, $t_0$, $t_1$, and $t_2$), and outputs mapped SDR $\hat{s}^{Cr}$ and metadata A person skilled in the art can appreciate that multiple other variations may be used to generate HDR-to-SDR or SDR-to-HDR mapping functions. For example, the NNMs in FIG. 3C may also use pixel location information as in FIG. 3B. Alternatively, all NNMs may take into consideration HDR and SDR frames from multiple time instances. Other image attributes that can be considered in a neural network may include image contrast, image saturation, and edge strength. For example, edge detections may be used to improve local tone-mappings.

Improving Computational Efficiency Using 3D Mapping Tables

As used herein, the term "3D Mapping Table (3D-MT or 3DMT)" refers to a 3D look-up table representing the input image data and being used for more efficient image processing. 3D Mapping Tables were first introduced in U.S. patent application Ser. No. 15/725,101, *"Inverse Luma/Chroma Mappings with Histogram Transfer and Approximation,"* filed on Oct. 4, 2017, by B. Wen et al., which is incorporated herein by reference. A 3D Mapping Table was derived as an extension of 2D Mapping, where an image in a first dynamic range was mapped into another dynamic range based on the constraint that the cumulative density functions (CDF) of both images should match.

A 3D-MT table reduces pixel-based computations and can yield mappings that generate output images with improved color accuracy. In an embodiment, a 3D-MT to be used in neural-networks-based mapping may be constructed as follows.

In a mapping using as references a first image and a second image, denote as $v_i = [v_i^y \; v_i^{c0} \; v_i^{c1}]^T$ the three-color value of the i-th pixel from the first image (e.g., an HDR image), and denote as $s_i = [s_i^y \; s_i^{c0} \; s_i^{c1}]^T$ the corresponding i-th pixel in the second image (e.g., an SDR image). First, one quantizes the first image with three channel values (e.g., Y, $C_0$ and $C_1$) using a fixed number of bins $Q_y$, $Q_{C_0}$, $Q_{C_1}$ for each component. Note that the number of bins in one color component may be different than the number of bins in the other color components. These bins will be used to compute its $(Q_y \times Q_{C_0} \times Q_{C_1})$ 3D histogram. Denote the 3D histogram as $\Omega^{Q,v}$, where $Q=[Q_y, Q_{C_0}, Q_{C_1}]$. Thus, $\Omega^{Q,v}$ contains a total of $Q_y Q_{C_0} Q_{C_1}$ bins, and each 3D bin specified by bin index q $(q_y, q_{C_0}, q_{C_1})$ represents the number of pixels having those 3-channel quantized values. For each 3D bin, one also computes the sum of each color component in the second image. Let $\Psi_y^{Q,s}$, $\Psi_{C_0}^{Q,s}$ and $\Psi_{C_1}^{Q,s}$ be the mapped luma and chroma values in the second image domain such that each bin of these contains the sum of all HDR luma and two chroma ($C_0$ and $C_1$, respectively) pixel values where the corresponding pixel value lies in that bin. These operations can be summarized in pseudo-code as described in Tables 1 to 3.

TABLE 1

Generating a 3D Mapping Table-Part A

// STEP 1: initialization
$\Omega_q^{Q,v} = 0$ where q = ($q_y$, $q_{C_0}$, $q_{C_1}$) and $q_{ch} = 0, \ldots, Q_{ch} - 1$,
for each ch = {Y, $C_0$, $C_1$}
$\Psi_{y,q}^{Q,s} = 0$ where q = ($q_y$, $q_{C_0}$, $q_{C_1}$) and $q_{ch} = 0, \ldots, Q_{ch} - 1$,
for each ch = {Y, $C_0$, $C_1$}
$\Psi_{C_0,q}^{Q,s} = 0$ where q = ($q_y$, $q_{C_0}$, $q_{C_1}$) and $q_{ch} = 0, \ldots, Q_{ch} - 1$,
for each ch = {Y, $C_0$, $C_1$}
$\Psi_{C_1,q}^{Q,s} = 0$ where q = ($q_y$, $q_{C_0}$, $q_{C_1}$) and $q_{ch} = 0, \ldots, Q_{ch} - 1$,
for each ch = {Y, $C_0$, $C_1$}
// STEP 2: scan each pixel in input image; compute histogram
and sum for (i = 0; i < $P_C$; i ++){// $P_C$ denotes the total number of bins across all colors $q_y = \left\lfloor \dfrac{v_i^y}{Q_y} \right\rfloor;$  // first image's luma quantized value $q_{C_0} = \left\lfloor \dfrac{v_i^{C_0}}{Q_{C_0}} \right\rfloor;$  // first image's chroma 0 quantized value $q_{C_1} = \left\lfloor \dfrac{v_i^{C_1}}{Q_{C_1}} \right\rfloor;$  // first image's chroma 1 quantized value $\Omega_q^{Q,v}$ ++;                                   // 3D histogram of first image
$\Psi_{y,q}^{Q,s} = \Psi_{y,q}^{Q,s} + s_i^y;$         // Mapped second image's y values
$\Psi_{C_0,q}^{Q,s} = \Psi_{C_0,q}^{Q,s} + s_i^{c0};$  // Mapped second image's $C_0$ values
$\Psi_{C_1,q}^{Q,s} = \Psi_{C_1,q}^{Q,s} + s_i^{c1};$  // Mapped second image's $C_1$ values
}

Let $(s_q^{y,(B)}, s_q^{C_0,(B)}, s_q^{C_1,(B)})$ represent the center of the q-th bin in the second image. These values are fixed for all frames and can be precomputed:

TABLE 2

Generating a 3D Mapping Table-Part B

// Recall that the bin index q = ($q_y$, $q_{C_0}$, $q_{C_1}$).
for ($q_y$ = 0; $q_y$ < $Q_y$; $q_y$ ++)
 for ($q_{C_0}$ = 0; $q_{C_0}$ < $Q_{C_0}$; $q_{C_0}$ ++)
  for ($q_{C_1}$ = 0; $q_{C_1}$ < $Q_{C_1}$; $q_{C_1}$ ++){

$v_q^{y,(B)} = \dfrac{(q_y + 0.5)}{Q_y}$  // normalized bin-value luma component in first image $v_q^{C_0,(B)} = \dfrac{(q_{C_0} + 0.5)}{Q_{C_0}}$  // normalized bin-value C0 component in first image $v_q^{C_1,(B)} = \dfrac{(q_{C_1} + 0.5)}{Q_{C_1}}$  // normalized bin-value C1 component in first image

}

The next step is to identify the 3D histogram bins that have non-zero number of pixels and discard those bins that do not have any pixels. Let $q_0, q_1, \ldots q_{k-1}$, be k such bins for which, $\Omega_q^{Q,v} \neq 0$. Compute the averages of $\Psi_{y,q}^{Q,s}$, $\Psi_{C_0,q}^{Q,s}$, and $\Psi_{C_1,q}^{Q,s}$.

TABLE 3

Generating a 3D Mapping Table-Part C

// The non-zero bin index $q_i = (q_y, q_{C_0}, q_{C_1})$.
for (i=0; i < k; i++) {

$$\overline{\Psi}_{y,q_i}^{Q,s} = \frac{\Psi_{y,q_i}^{Q,s}}{\Omega_{q_i}^{Q,v}}; \quad // \text{ Average 3D-Mapping second image y values}$$

$$\overline{\Psi}_{C_0,q_i}^{Q,s} = \frac{\Psi_{C_0,q_i}^{Q,s}}{\Omega_{q_i}^{Q,v}}; \quad // \text{ Average 3D-Mapping second image } C_0 \text{ values}$$

$$\overline{\Psi}_{C_1,q_i}^{Q,s} = \frac{\Psi_{C_1,q_i}^{Q,s}}{\Omega_{q_i}^{Q,v}}; \quad // \text{ Average 3D-Mapping second image } C_1 \text{ values}$$

}

Denote $$v_q^{(B)} = [v_q^{y,(B)} v_q^{C_0,(B)} v_q^{C_1,(B)}]^T$$

and $$\overline{\Psi}_q^{Q,s} = [\overline{\Psi}_{y,q}^{Q,s} \overline{\Psi}_{C_0,q}^{Q,s} \overline{\Psi}_{C_1,q}^{Q,s}]^T. \quad (15)$$

Then, the original set of $v_i$ and $s_i$ values is replaced with the pair $v_q^{(B)}$ and $\overline{\Psi}_q^{Q,s}$ as defined above for valid q values.

Figure 4:
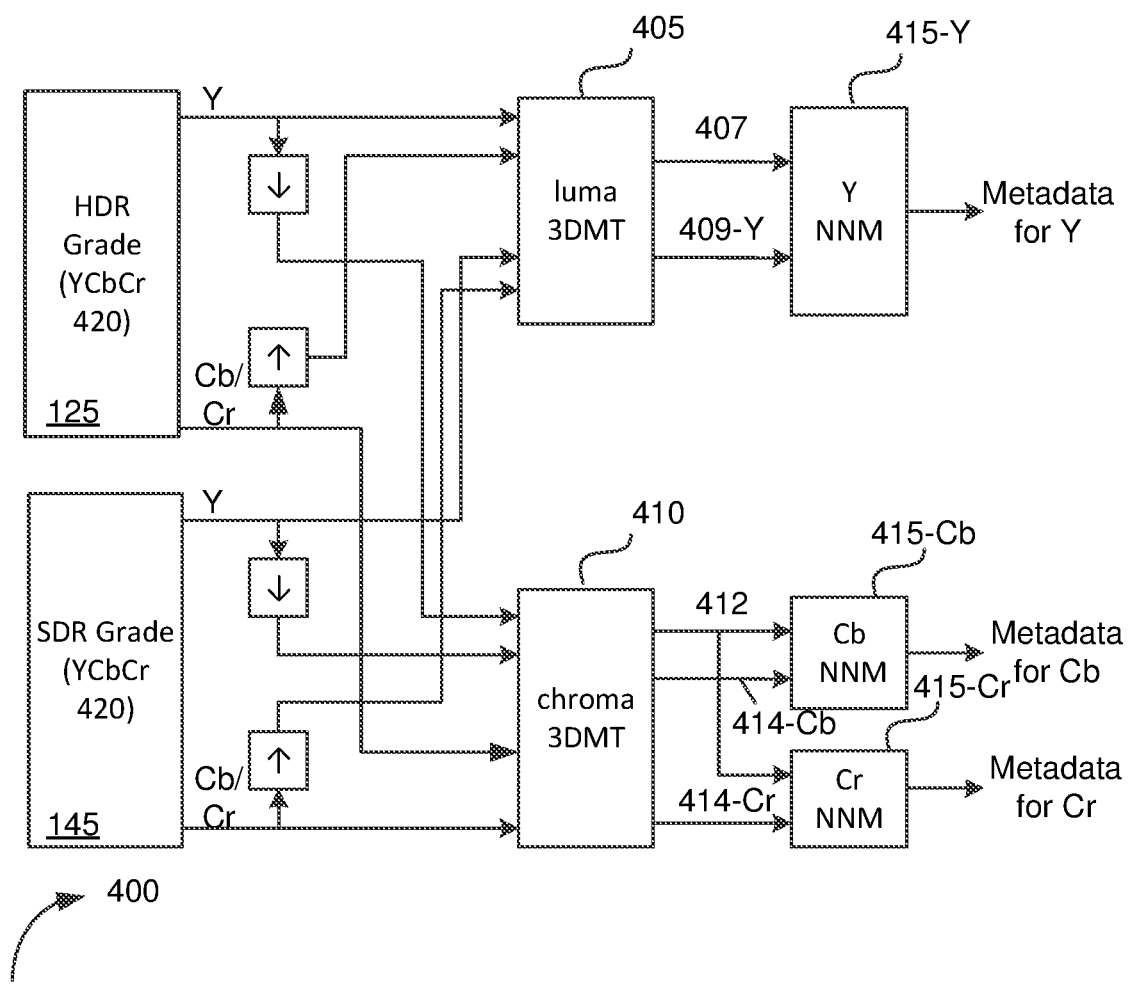
FIG. 4 depicts an example system for generating global mapping using neural networks and 3D Mapping Tables, according to an embodiment of the present invention.

FIG. 4 depicts an example architecture (400) for generating an HDR to SDR mapping using 3D mapping tables and neural networks according to an embodiment. As depicted in FIG. 4, the system utilizes two 3D-MTs: a luma 3D-MT (405) and a chroma 3D-MT (410). To generate these 3D-MTs, one may apply the steps in Tables 1 to 3 for the following inputs:

For the Luma 3D-MT: Inputs are: HDR Y in original resolution, HDR Cb/Cr up-sampled, SDR Y in original resolution, and SDR Cb/Cr up-sampled; the outputs can be denoted as a mapping of $$[v_q^{y,(B)} v_q^{C_0,(B)} v_q^{C_1,(B)}]^T \text{ (407) into } [\overline{\Psi}_{y,q}^{Q,s} \overline{\Psi}_{C_0,q}^{Q,s} \overline{\Psi}_{C_1,q}^{Q,s}]^T \quad (409)$$

For the Chroma 3DMT: Inputs are HDR Y down-sampled, HDR Cb/Cr in original resolution, SDR Y down-sampled, and SDR Cb/Cr in original resolution; the outputs can be denoted as a mapping of $$[v_q^{y,(B)} v_q^{C_0,(B)} v_q^{C_1,(B)}]^T \text{ (412) into } [\overline{\Psi}_{y,q}^{Q,s} \overline{\Psi}_{C_0,q}^{Q,s} \overline{\Psi}_{C_1,q}^{Q,s}]^T \quad (414).$$

In system 400, the three neural-network mappings (415), (for luma and chroma) are generated based on the outputs of the two 3D-MTs. For example, in an embodiment, for:
the Y NNM, the inputs are $[v_q^{y,(B)} v_q^{C_0,(B)} v_q^{C_1,(B)}]^T$ (407) and $\overline{\Psi}_{y,q}^{Q,s}$ (409-Y) from the first 3DMT, and the output will be the parameters of the Y-NNM network
the Cb NNM, the inputs are $[v_q^{y,(B)} v_q^{C_0,(B)} v_q^{C_1,(B)}]^T$ (412) and $\overline{\Psi}_{C_0,q}^{Q,s}$ (414-Cb) from the second 3DMT, and the output will be the parameters of the Cb-NNM network
the Cr NNM, the inputs are $[v_q^{y,(B)} v_q^{C_0,(B)} v_q^{C_1,(B)}]^T$ (412) and $\overline{\Psi}_{C_1,q}^{Q,s}$ (414-Cr) from the second 3DMT, and the output will be the parameters of the Cr-NNM network
Using 3DMTs provides the following advantages: a) One can exercise the neural networks using far fewer points, since the number of bins is much smaller than the number of pixels. This allows for faster convergence, which is very important in real-time applications. b) Generating the 3D-MTs in effect consolidates pixels into bins of "important pixels," thus reducing the effects of biasing the NN decisions by multiple pixels of lower value in terms of image quality.

The (400) system is equivalent to the one described in FIG. 3A. It can be easily extended to support the architectures in FIG. 3B and FIG. 3C by extending the concept of 3D mapping tables to higher dimensions, e.g. by using a 5D-MT for local mapping (FIG. 3B).

Figure 3E:
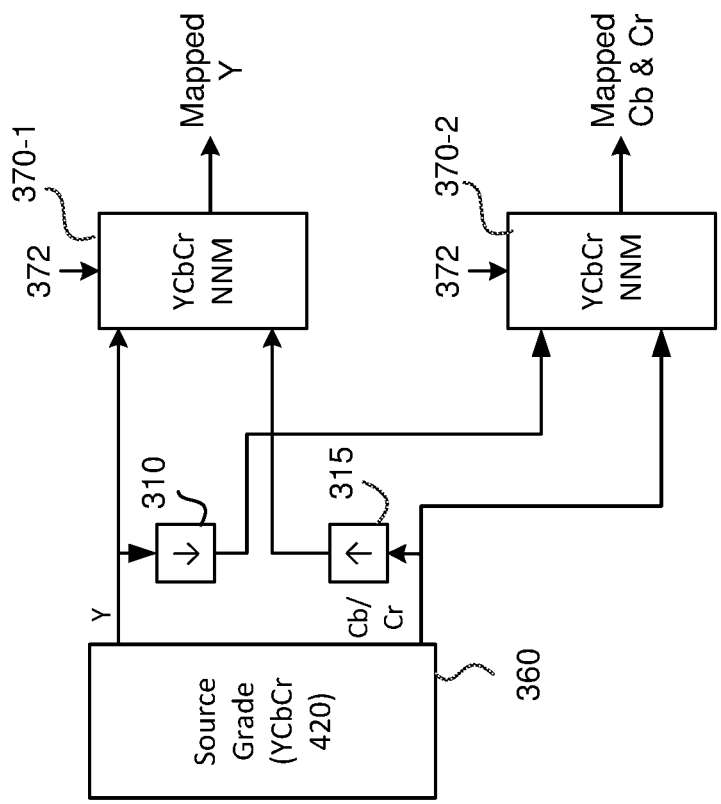
FIG. 3E depicts an example system for a predictor using a single YCbCr neural network mapping according to an embodiment of the present invention.
Figure 3D:
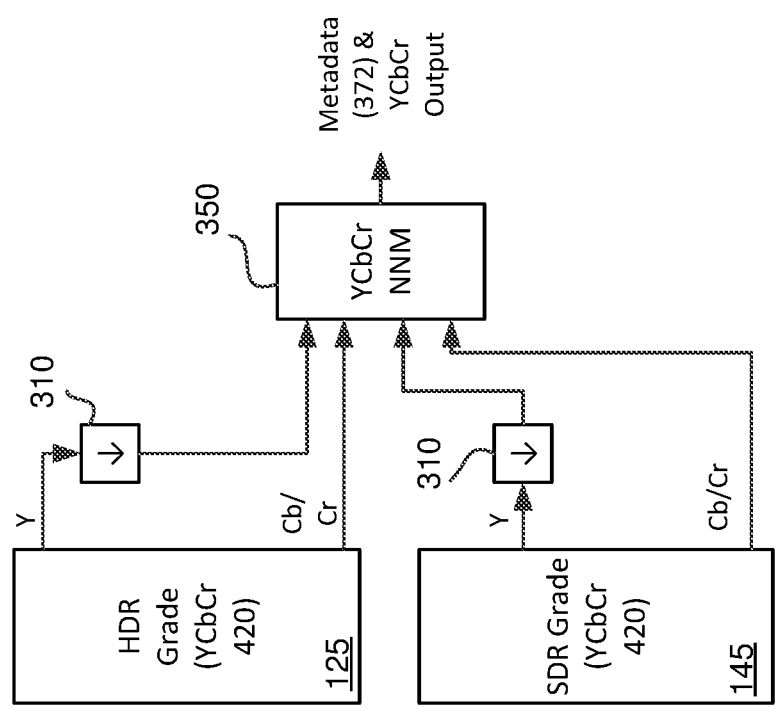
FIG. 3D depicts an example system for generating a global mapping using a single YCbCr network according to an embodiment of the present invention.

In another embodiment, the three neural networks (415) Y-NNM, Cb-NNM, and Cr-NNM, could be combined into a single YCbCr-NNM, generating directly both luma and chroma values. Such an implementation would require fewer NN parameters to represent the HDR to SDR mapping. As an example, FIG. 3D depicts a system to generate a global mapping between two color grades using a single YCbCr NNM (350). Given the NNM parameters (372) generated by the system in FIG. 3D, FIG. 3E depicts an example predictor (e.g., 250D) which applies the mapping function (as characterized by the parameters of the NN, that is, metadata (372) to reconstruct the original data using YCbCr NNM 370. For example, if signal 360 (source grade) represents SDR data, then the mapped YCbCr data represent the predicted HDR data, and if signal 360 represents input HDR data, then, the mapped YCbCr data represent the predicted SDR data. The two YCbCr NNs (370-1, 370-2) are identical, but each one handles the input data slightly differently. For luma (Y), NNM 370-1 requires input chroma data to be up-sampled to full resolution (same as the resolution of Y). The Cb/Cr output of 370-1 is discarded. For chroma, NNM 370-2 requires the input luma data to be down-sampled to match the resolution of the chroma components. The luma output of NNM 370-2 may be discarded. In another embodiment, NNM 370 may be a single, time-shared, NN network.

Figure 3F:
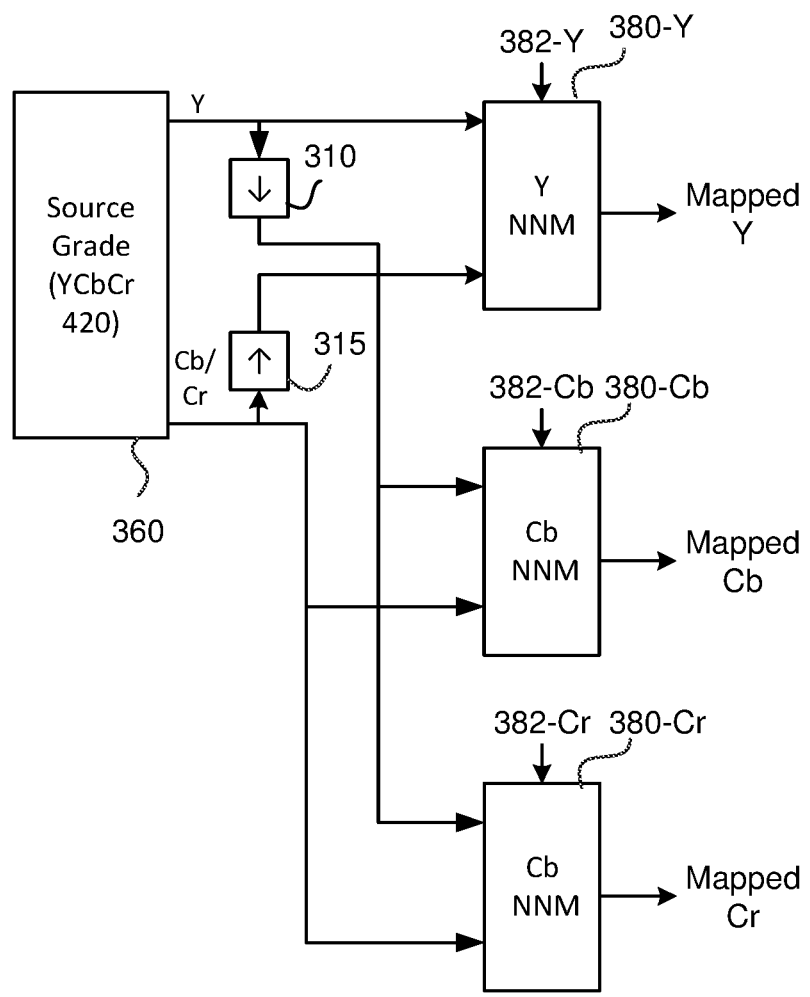
FIG. 3F depicts an example system for a predictor using a global-mapping neural network according to an embodiment of the present invention.

The architecture depicted in FIG. 3E can easily be adapted for any of the other neural network mapping designs described earlier in FIGS. 3A-3C. For example, FIG. 3F depicts a predictor based on the global mapping of FIG. 3A. NNMs (370) in FIG. 3E are now replaced with three distinct NNs, one for Y (380-Y), one for Cb (380-Cb), and one for Cr (380-Cr), each one receiving its own distinct metadata (382-Y/Cb/Cr). As in FIG. 3E, for 4:2:0 data, luma and chroma inputs to each of these NNs are up-sampled or down-sampled appropriately As depicted in FIG. 3F, assuming a v (360) to ŝ mapping:
Y-NNM (380-Y) has inputs $v^1$, $v^{Cb,Cr}$ (up-sumpled), and metadata 382-Y, and outputs mapped $\hat{s}^Y$
Cb-NNM (380-Cb) has inputs $v^Y$(down-sampled), $v^{Cb,Cr}$, and metadata 382-Cb, and outputs mapped $\hat{s}^{Cb}$
Cr-NNM (380-Cr) has inputs $v^Y$(down-sampled), $v^{Cb,Cr}$, and metadata 382-Cb, and outputs mapped $\hat{s}^{Cr}$ In other embodiments, computational complexity in all systems may be decreased by employing pixel subsampling both spatially and temporally. For example, in video sequences, the neural networks may be solved using sub-sampled frames and/or the results may be used for multiple consecutive frames. Furthermore, at the NN level, for each frame, initialization values may be a simple copy of the solutions from the previous frame.

Bitstream Syntax for Metadata Transmission

As described earlier, NNM metadata include the input normalization parameters and the neural-network parameters. These values are typically floating-point numbers in single or double precision. Metadata overhead can be reduced by applying known in the art lossy or lossless data compression schemes to reduce the amount of metadata overhead data without affecting the efficiency of the mapping.

Table 4 depicts an example of bitstream syntax to communicate NNM metadata from an encoder (130) to a decoder (150) according to an embodiment.

TABLE 4

Example bitstream syntax to support NNM metadata

```
else if( mapping_idc [ y ][ x ][ cmp ] == MAPPING_NNM ) {
    // normalization
    nnm_norm_gain_int[ y ][ x ][ cmp ]                                                    0   se(v)
    nnm_norm_gain_coef[ y ][ x ][ cmp ]                                                   0   u(v)
    nnm_norm_nmin_int[ y ][ x ][ cmp ]                                                    0   se(v)
    nnm_norm_nmin_coef[ y ][ x ][ cmp ]                                                   0   u(v)
    nnm_norm_vmin_int[ y ][ x ][ cmp ]                                                    0   se(v)
    nnm_norm_vmin_coef[ y ][ x ][ cmp ]                                                   0   u(v)
    nnm_num_layer[ y ][ x ][ cmp ]                                                        0   ue(v)
    // neural layers
    for( i = 0; i < nnm_num_layer[ y ][ x ][ cmp ]; i ++ ) {   //for each layer
        nnm_num_neuron[ y ][ x ][ cmp ][i]                                                0   ue(v)
        for( j = 0; j < ( nnm_num_neuron[ y ][ x ][ i-1 ] + 1 ) *
            nnm_num_neuron[ y ][ x ][ i ] ; j ++ ) {
            // fully connected weights ; constant/bias is included in weight
            nnm_weight_int[ y ][ x ][ cmp ][i][j]                                         0   se(v)
            nnm_weight_coef[ y ][ x ][ cmp ][i][j]                                        0   e(v)
        }
    }
    // last layer; linear combining all neurons in previous layer
    for( j = 0; j < nnm_num_neuron[ y ][ x ][ nnm_num_layer[ y ][ x ][ cmp ]-1 ];
        j ++ ) {
        nnm_weight_int[ y ][ x ][ cmp ][ nnm_num_layer[ y ][ x ][ cmp ]][j]              0   se(v)
        nnm_weight_coef[ y ][ x ][ cmp ][ nnm_num_layer[ y ][ x ][ cmp ]][j]             0   u(v)
    }
}
```

In Table 4, the descriptors se(v), u(v), and ue(v), may be defined as in known-in the art specifications for video decoding, such as ITU-T1.265, "High Efficiency Coding." The value of "cmp" denotes the color component, e.g., 0 for Y, 1 for Cb, and 2 for Cr. Additional variables may be defined as follows:

nnm_num_neuron[y][x][cmp] specifies the mapping types, for example: nnm_num_neuron[y][x][−1]=3 for global mapping, nnm_num_neuron[y][x][−1]=5 for local mapping, and nnm_num_neuron[y][x][−1]=4 for multi-grade mapping.

nnm_norm_gain_int[y][x][cmp] specifies the integer portion of fp_nnm_norm_gain_coef[y][x][cmp] when coefficient_data_type is equal to 0. If coefficient_data_type is equal to 1, nnm_norm_gain_int [y][x][cmp] is not present. Note—fp_nnm_norm_gain_coef[y][x][cmp] is used to derive the value of the gain coefficient in the normalization associated with mapping_idc[y][x][cmp] when coefficient_data_type is equal to 0.

nnm_norm_gain_coef[y][x][cmp] specifies the fractional portion of fp_nnm_norm_gain_coef[y][x][cmp] when coefficient_data_type is equal to 0. If coefficient_data_type is equal to 1, nnm_norm_gain_coef [y][x][cmp] is used to derive the value of the gain coefficients associated with mapping_idc[y][x][cmp]. If coefficient_data_type is equal to 0, the length of the nnm_norm_gain_coef [y][x][cmp] syntax element is coefficient_log 2_denom bits. If coefficient_data_type is equal to 1, the length of the nnm_norm_gain_coef [y][x][cmp] syntax element is 32 bits. The value of the gain coefficient in the normalization associated with mapping_idc[y][x][cmp] is derived as follows:

If coefficient_data_type is equal to 0, the value of the gain coefficient is equal to fp_nnm_norm_gain_coef[y][x][cmp]=(nnm_norm_gain_int [y][x][cmp] coefficient_log 2_denom)+nnm_norm_gain_coef [y][x][cmp].

If coefficient_data_type is equal to 1, the value of the gain coefficient is equal to nnm_norm_gain_coef [y][x][cmp].

nnm_norm_nmin_int[y][x][cmp] specifies the integer portion of fp_nnm_norm_nmin_coef[y][x][cmp] when coefficient_data_type is equal to 0. If coefficient_data_type is equal to 1, nnm_norm_nmin_int [y][x][cmp] is not present. Note—fp_nnm_norm_nmin_coef[y][x][cmp] is used to derive the value of the minimum value in the normalization domain associated with mapping_idc[y][x][cmp] when coefficient_data_type is equal to 0.

nnm_norm_nmin_coef[y][x][cmp] specifies the fractional portion of fp_nnm_norm_nmin_coef[y][x][cmp] when coefficient_data_type is equal to 0. If coefficient_data_type is equal to 1, nnm_norm_nmin_coef [y][x][cmp] is used to derive the value of the gain coefficients associated with mapping_idc[y][x][cmp]. If coefficient_data_type is equal to 0, the length of the nnm_norm_nmin_coef [y][x][cmp] syntax element is coefficient_log 2_denom bits. If coefficient_data_type is equal to 1, the length of the nnm_norm_nmin_coef [y][x][cmp] syntax element is 32 bits. The value of the gain coefficient in the normalization associated with mapping_idc[y][x][cmp] is derived as follows:

If coefficient_data_type is equal to 0, the value of the gain coefficient is equal to fp_nnm_norm_nmin_coef[y][x][cmp]=(nnm_norm_nmin_int [y][x][cmp] coefficient_log 2_denom)+nnm_norm_nmin_coef [y][x][cmp].

If coefficient_data_type is equal to 1, the value of the gain coefficient is equal to nnm_norm_nmin_coef [y][x][cmp].

nnm_norm_vmin_int[y][x][cmp] specifies the integer portion of fp_nnm_norm_vmin_coef[y][x][cmp] when coefficient_data_type is equal to 0. If coefficient_data_type is equal to 1, nnm_norm_nmin_int [y][x][cmp] is not present. Note—fp_nnm_norm_vmin_coef[y][x][cmp] is used to derive the value of the minimum value in the de-normalization domain associated with mapping_idc[y][x][cmp] when coefficient_data_type is equal to 0.

nnm_norm_vmin_coef[y][x][cmp] specifies the fractional portion of fp_nnm_norm_vmin_coef[y][x][cmp] when coefficient_data_type is equal to 0. If coefficient_data_type is equal to 1, nnm_norm_vmin_coef [y][x][cmp] is used to derive the value of the gain coefficients associated with mapping_idc[y][x][cmp]. If coefficient_data_type is equal to 0, the length of the nnm_norm_vmin_coef [y][x][cmp] syntax element is coefficient_log 2_denom bits. If coefficient_data_type is equal to 1, the length of the nnm_norm_vmin_coef [y][x][cmp] syntax element is 32 bits. The value of the gain coefficient in the normalization associated with mapping_idc[y][x][cmp] is derived as follows:

If coefficient_data_type is equal to 0, the value of the gain coefficient is equal to fp_nnm_norm_vmin_coef[y][x][cmp]=(nnm_norm_vmin_int [y][x][cmp] coefficient_log 2_denom)+nnm_norm_vmin_coef [y][x][cmp].

If coefficient_data_type is equal to 1, the value of the gain coefficient is equal to nnm_norm_vmin_coef [y][x][cmp].

nnm_num_layer signals the number of layers associated with mapping_idc[y][x][cmp].

nnm_weight_int[y][x][cmp][i][j] specifies the integer portion of fp_nnm_weight_coef[y][x][cmp][i][j] when coefficient_data_type is equal to 0. If coefficient_data_type is equal to 1, nnm_weight_int [y][x][cmp][i][j] is not present. Note—fp_nnm_weight_coef[y][x][cmp][i][j] is used to derive the weighting coefficients for node i at layer j associated with mapping_idc[y][x][cmp][i]][j] when coefficient_data_type is equal to 0.

nnm_weight_coef[y][x][cmp][i][j] specifies the fractional portion of fp_nnm_weight_coef[y][x][cmp][i][j] when coefficient_data_type is equal to 0. If coefficient_data_type is equal to 1, nnm_weight_coef [y][x][cmp][i][j] is used to derive the value of the gain coefficients associated with mapping_idc[y][x][cmp]. If coefficient_data_type is equal to 0, the length of the nnm_weight_coef [y][x][cmp][i][j] syntax element is coefficient_log 2_denom bits. If coefficient_data_type is equal to 1, the length of the nnm_weight_coef [y][x][cmp][i][j] syntax element is 32 bits. The value of the gain coefficient in the normalization associated with mapping_idc[y][x][cmp] is derived as follows:

If coefficient_data_type is equal to 0, the value of the gain coefficient is equal to fp_nnm_weight_coef[y][x][cmp][i][j]=(nnm_weight_int [y][x][cmp][i][j]<< coefficient_log 2_denom)+nnm_weight_coef [y][x][cmp][i][j]

If coefficient_data_type is equal to 1, the value of the gain coefficient is equal to nnm_weight_coef [y][x][cmp][i][j].

Figure 5:
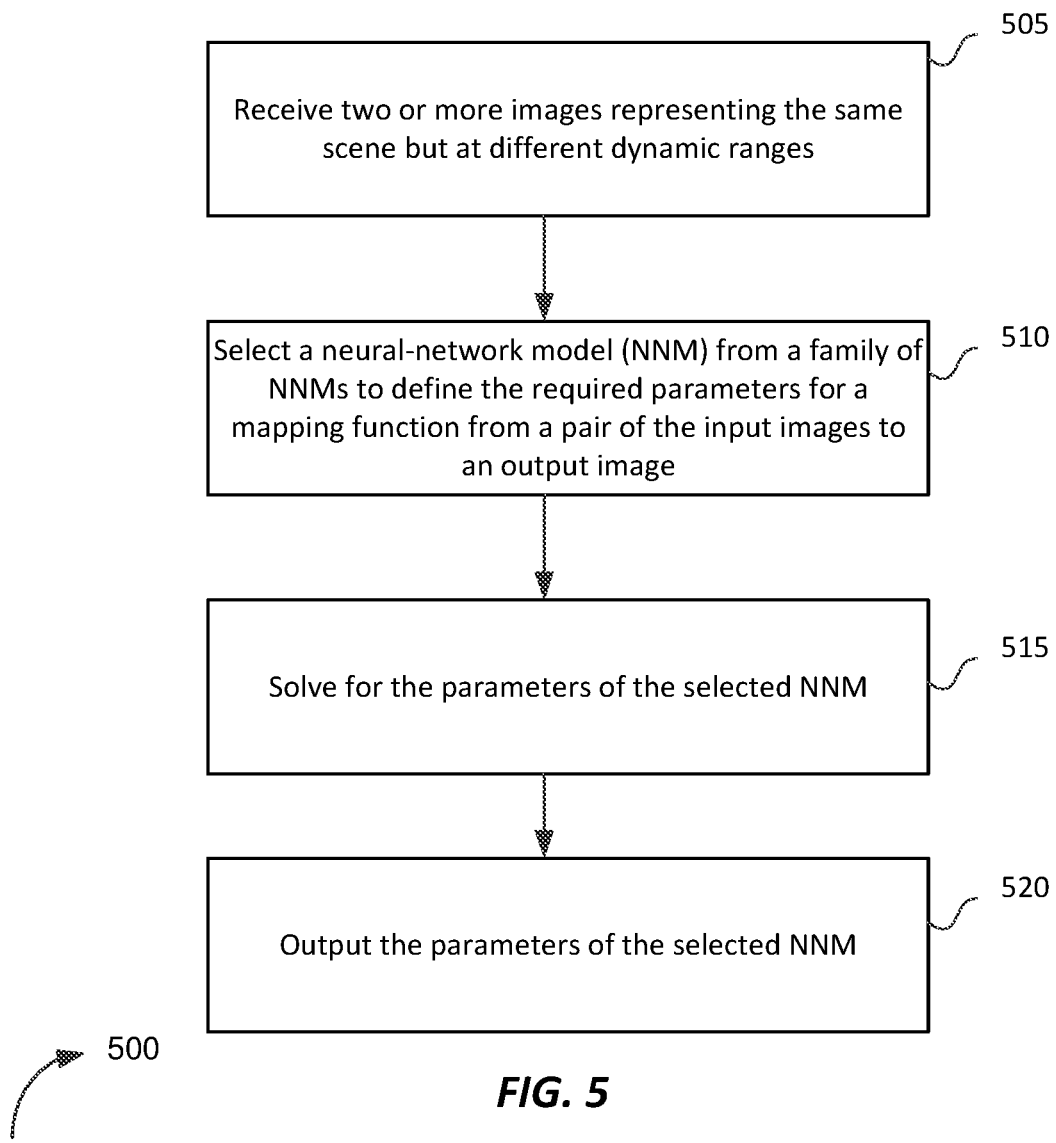
FIG. 5 depicts an example process for deriving image-mapping functions using neural networks according to an embodiment of the present invention.

FIG. 5 shows an example process (500) for deriving an image-mapping function between two images representing the same scene but at different dynamic ranges and/or color gamut. The process starts in step 505, wherein a mapping processor, such as predictor 250E, receives two or more images representing the same scene, but at different dynamic ranges, say, a reference input HDR image and one or more derivative grades of an SDR or alternative HDR representations of the same image. Given these inputs, in step 510, the mapping processor decides on which neural network (NN) model to select. As described before, the mapping processor may select among a variety of NN models, including (but not necessarily limited to): a global mapping model, a local mapping model, a mapping using multiple grades, or a combination of the above. Furthermore, each of these models may be characterized by a different number of levels and nodes within each level.

The selection of the NN model can be done using a variety of methods that take into considerations a number of criteria, including: prior knowledge on the SDR and HDR inputs, available computational and memory resources, and target coding efficiency. For example, in an embodiment, the NN model may be selected based on whether the value of the residual MSE between the target output and the reference grade it tries to approximate (see equation (6)) satisfies a predetermined threshold. Given an NN model and two or more input images, the NN parameters (e.g., the node weights and biases) are derived in step 515 according to an optimization criterion. Finally, in step 520, the mapping processor outputs the parameters of the NN model. Optionally, the mapping processor may also output the generated mapped (output) image.

This mapping process 500 may be repeated at a variety of intervals as deemed necessary to maintain coding efficiency while using available computing resources. For example, when coding video signals, process 500 can be repeated on a per predefined video slice size basis, for each frame, a group of frames, or whenever the prediction residual exceeds a particular threshold.

Mapping process 500 may use all available input pixels or a sub-sample of those pixels. In one example implementation, one may use pixels only from every k-th pixel row and every k-th pixel column of the input data, where k is an integer equal or higher than two. In another example implementation one may decide to skip input pixels that are below a certain clipping threshold (for example, very close to zero) or pixels that are above a certain saturation threshold (for example, for n-bit data, pixel values that are very close to $2^n-1$.) In yet another implementation, one may use a combination of such subsampling and thresholding techniques to reduce the pixel sample size and accommodate the computational constrains of a particular implementation.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to NNM-based mapping, such as those described herein. The computer and/or IC may compute, any of a variety of parameters or values that relate to the NNM-based mapping as described herein. The image and video dynamic range extension embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement NNM-based mapping methods as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to applying neural networks in mapping HDR and SDR images are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Enumerated Example Embodiments

Enumerated example embodiments ("EEEs") of the present invention have been described above in relation to methods and devices for recovering saturated pixel values in raw pixel data. Thus, an embodiment of the present invention may relate to one or more of the examples, enumerated below:

EEE 1. In an encoder, a method for mapping images from a first dynamic range to a second dynamic range, the method comprising:
providing one or more neural network (NN) models, each adapted to approximate an image having a first dynamic range in terms of an image having a second dynamic range; receiving a first image in the first dynamic range and a second image in the second dynamic range, wherein the two images represent the same scene;
selecting a neural network model from the variety of NN models to determine an output image which approximates the second image based on the first image and the second image;
determining values of the parameters of the selected NN model according to an optimizing criterion, the first image and the second image, wherein the parameters comprise node weights and node biases for each of the nodes in each layer of the selected NN model; and outputting the parameters of the selected NN model.

EEE 2. The method of EEE 1, wherein the one or more NN models comprise a global-mapping NN model, a local-mapping NN model, and a global-mapping using multiple color-grades NN model.

EEE 3. The method of any preceding EEE, wherein the one or more NN models comprise a global mapping NN model, and the global mapping NN model comprises three neural networks, one for each of the color components of the first and the second image, and each of the three neural networks receives inputs based on pixel values of all three color components of the first image and the second image.

EEE 4. The method of any preceding EEE, wherein the one or more NN models comprise a local-mapping model, and the local-mapping NN model comprises three neural networks, one for each of the color components of the first and the second image, and each of the three neural networks receives inputs based on pixel values of all three color components of the first image and the second image and an input indicating the pixel coordinates of the input pixel values.

EEE 5. The method of any preceding EEE, further comprising receiving a third image in a third dynamic range, wherein the third image represents the same scene as the first and the second image,
wherein the one or more NN models comprise a global-mapping using multiple color-grades model which comprises three neural networks, one for each of the color components of the three images, and each of the three neural networks receives inputs based on pixel values of all three color components of the three images and an input indicating the color grades of the input pixel values.

EEE 6. The method of EEE 5, wherein the input indicating the color grades of the input grades of the input pixels comprises a normalized vector of the normalized peak brightness of each color grade.

EEE 7. The method of any one of EEEs 3-5, wherein input pixel values to each of the three neural networks are normalized between −1 and 1.

EEE 8. The method of EEE 7, wherein the parameters of the selected NN model further comprise a gain factor, a minimum value, and a maximum value for each color component of the normalized input pixel values.

EEE 9. The method of any one of EEEs 3-5, wherein all input images are in a 4:2:0 YCbCr color format and further comprising:
an image down-sampler to down-sample the Y component of the first image to the resolution of the Cb or Cr components of the first image before it is inputted in the neural networks of the second (Cb) and third (Cr) color components;
an image up-sampler to up-sample the Cb and Cr components of the second image to the resolution of the Y component of the first image before they are inputted in the neural network of the first (Y) color component.

EEE 10. The method of EEE 4 or any preceding EEE when dependent on EEE 4, wherein the pixel coordinates comprise an (x,y) location pair and values in the location pair are normalized to be between 0 and 1.

EEE 11. The method of any preceding EEE, wherein the optimizing criterion comprises minimizing the mean square error between the output image and the second input image.

EEE 12. The method of EEE 3 or any preceding EEE when dependent on EEE 3, wherein all input images are in a 4:2:0 YCbCr color format, further comprising:

generating a first 3D Mapping Table (3DMT) representing input luma (Y) and chroma (Cb or Cr) pixel values from the first and the second images as a mapping of first normalized luma and chroma sampled points in the first image into first average luma and chroma 3D mappings into the second image, wherein the input chroma pixel values are up-sampled to match the spatial resolution of the input luma pixel values;

generating a second 3DMT representing input luma pixel values and chroma pixel values from the first and the second images as a mapping of second normalized luma and chroma sample points in the first image into second average luma and chroma 3D mappings into the second image, wherein the input luma pixel values are down-sampled to match the spatial resolution of the input chroma pixel values;

generating the parameters of the neural network of the Y output component by feeding it as input the first normalized luma and chroma sample points in the first image and the first average luma 3D mapping into the second image;

generating the parameters of the neural network of the Cb output component by feeding it as input the second normalized luma and chroma sample points in the first image and the second average Cb 3D mapping into the second image; and generating the parameters of the neural network of the Cr output component by feeding it as input the second normalized luma and chroma sample points in the first image and the second average Cr 3D mapping into the second image.

EEE 13. The method of any preceding EEE, wherein the first dynamic range is equal to the second dynamic range or higher than the second dynamic range.

EEE 14. The method of any preceding EEE, wherein the first dynamic range is lower than the first dynamic range.

EEE 15. The method of any preceding EEE, further comprising:

generating the output image;

compressing the output image to generate an encoded image; and combining the encoded image and the parameters of the selected NN model to generate an output bitstream.

EEE 16. In a decoder, a method for mapping an image from a first dynamic range to a second dynamic range, the method comprising:

receiving a compressed bitstream comprising an encoded image in a first dynamic range and image metadata, wherein the image metadata comprise parameters for a neural network (NN) model to map the encoded image to an output image, wherein the image metadata comprise for one or more color components of the encoded image a number of neural-net layers in the NN, a number of neural nodes for each layer, and a weight and an offset to be used with an activation function of each node; and generating an output image based on the encoded image and the parameters of the NN model.

EEE 17. The method of EEE 16, wherein the image metadata further comprise scaling metadata, wherein for each color component of the encoded image the scaling metadata comprise a gain, a minimum, and a maximum value, and the method further comprises generating a de-normalizing output image based on the scaling metadata and the output image.

EEE 18. The method of EEE 16 or 17, wherein the activation function comprises a sigmoid function.

EEE 19. A non-transitory computer-readable storage medium having stored thereon computer-executable instructions for executing with one or more processors a method in accordance with EEEs 1-18.

EEE 20. An apparatus comprising a processor and configured to perform any one of the methods recited in EEEs 1-18.

What is claimed is:

1. A method for mapping images from a first dynamic range to a second dynamic range, wherein the first dynamic range is different from the second dynamic range, the method comprising:

providing one or more neural network (NN) models, each adapted to approximate an image having a first dynamic range in terms of an image having a second dynamic range;

receiving a first image in the first dynamic range and a second image in the second dynamic range, wherein the two images represent the same scene;

selecting a neural network model from the one or more NN models to determine an output image which approximates the second image based on the first image and the second image;

determining values of parameters of the selected NN model according to an optimizing criterion, the first image and the second image, wherein the parameters comprise node weights and/or node biases for nodes of the layers of the selected NN model; and outputting the parameters of the selected NN model, wherein the method further comprises receiving a third image in a third dynamic range, wherein the third image represents the same scene as the first and the second image, and wherein the one or more NN models comprise a global-mapping using multiple color-grades model which comprises three neural networks, one for each of the color components of the first image, the second image, and the third image, and each of the three neural networks receives inputs based on pixel values of all three color components of the first image, the second image, and the third image and an input indicating the color grades of the input pixel values, and wherein the one or more NN models comprise a local-mapping model, and the local-mapping NN model comprises three neural networks, one for each of the color components of the first and the second image, and each of the three neural networks receives inputs based on pixel values of all three color components of the first image and the second image and an input indicating the pixel coordinates of the input pixel values.

2. The method of claim 1, wherein the one or more NN models comprise a global mapping NN model, and the global mapping NN model comprises three neural networks, one for each of the color components of the first and the second image, and each of the three neural networks receives inputs based on pixel values of all three color components of the first image and the second image.

3. The method of claim 2, wherein input pixel values to each of the three neural networks are normalized between −1 and 1.

4. The method of claim 3, wherein the parameters of the selected NN model further comprise a gain factor, a minimum value, and a maximum value for each color component of the normalized input pixel values.

5. The method of claim 2, wherein all input images are in a 4:2:0 YCbCr color format and further comprising:

down-sampling the Y component of the first image to the resolution of the Cb or Cr components of the first image before it is inputted in the neural networks of the second (Cb) and third (Cr) color components; and up-sampling the Cb and Cr components of the second image to the resolution of the Y component of the first image before they are inputted in the neural network of the first (Y) color component.

6. The method of claim 1, wherein the input indicating the color grades of the input grades of the input pixels comprises a normalized vector of the normalized peak brightness of each color grade.

7. The method of claim 1, wherein the pixel coordinates comprise an (x,y) location pair and values in the location pair are normalized to be between 0 and 1.

8. The method of claim 1, wherein the optimizing criterion comprises minimizing the mean square error between the output image and the second input image.

9. The method of claim 1, wherein all input images are in a 4:2:0 YCbCr color format, further comprising:

generating a first 3D Mapping Table (3DMT) representing input luma (Y) and chroma (Cb or Cr) pixel values from the first and the second images as a mapping of first normalized luma and chroma sample points in the first image into first average luma and chroma 3D mappings into the second image, wherein the input chroma pixel values are up-sampled to match the spatial resolution of the input luma pixel values;

generating a second 3DMT representing input luma pixel values and chroma pixel values from the first and the second images as a mapping of second normalized luma and chroma sample points in the first image into second average luma and chroma 3D mappings into the second image, wherein the input luma pixel values are down-sampled to match the spatial resolution of the input chroma pixel values;

generating the parameters of the neural network of the Y output component by feeding it as input the first normalized luma and chroma sample points in the first image and the first average luma 3D mapping into the second image;

generating the parameters of the neural network of the Cb output component by feeding it as input the second normalized luma and chroma sample points in the first image and the second average Cb 3D mapping into the second image; and generating the parameters of the neural network of the Cr output component by feeding it as input the second normalized luma and chroma sample points in the first image and the second average Cr 3D mapping into the second image.

10. The method of claim 1, wherein the first dynamic range is equal to, lower than, or higher than the second dynamic range.

11. The method of claim 1, further comprising:
generating the output image;
compressing the output image to generate an encoded image; and
combining the encoded image and the parameters of the selected NN model to generate an output bitstream.

12. A method for mapping an image from a first dynamic range to a second dynamic range, wherein the first dynamic range is different from the second dynamic range, the method comprising:

receiving a compressed bitstream comprising an encoded image in a first dynamic range and image metadata, wherein the image metadata comprise parameters for a neural network (NN) model to map the encoded image to an output image, wherein the image metadata comprise for one or more color components of the encoded image a number of neural-net layers in the NN, a number of neural nodes for at least one layer, and a weight and an offset to be used with an activation function of a node of the at least one layer, wherein the image metadata further comprise scaling metadata, wherein for each color component of the encoded image the scaling metadata comprise a gain, a minimum, and a maximum value, and the method further comprises generating a de-normalizing output image based on the scaling metadata and the output image; and generating an output image based on the encoded image and the parameters of the NN model, wherein the NN model comprise a global-mapping using multiple color-grades model which comprises three neural networks, one for each of the color components of three images, the three images represent the same scene and have respective dynamic ranges, and each of the three neural networks receives inputs based on pixel values of all three color components of the three images and an input indicating the color grades of the input pixel values.

* * * * *